United States Patent [19]

Barbaza et al.

[11] Patent Number: 5,164,536

[45] Date of Patent: Nov. 17, 1992

[54] COMPOSITE ARMORED SEAT, AND METHOD OF MANUFACTURE

[75] Inventors: François R. Barbaza, Pautillac; Michel Vives, Eystines, both of France

[73] Assignee: Societe Europeenne de Propulsion, Suresnes, France

[21] Appl. No.: 615,399

[22] Filed: Nov. 19, 1990

[30] Foreign Application Priority Data

Nov. 24, 1989 [FR] France ................... 89 15514

[51] Int. Cl.$^5$ .............................. B64D 7/00
[52] U.S. Cl. ...................... 89/36.11; 89/36.02; 244/122 R
[58] Field of Search ............. 89/36.11, 36.16, 36.02; 244/122 R, 122 A; 297/457, 454, 443; 108/153, 154

[56] References Cited

U.S. PATENT DOCUMENTS

| | | | |
|---|---|---|---|
| 2,393,499 | 1/1946 | Flint | 297/457 |
| 2,847,061 | 8/1958 | Morton | 297/457 |
| 2,964,419 | 12/1960 | Link et al. | 89/36.02 |
| 3,262,405 | 7/1966 | Sutton | 108/153 |
| 3,581,620 | 6/1971 | Hauck | 89/36.11 |
| 3,658,382 | 4/1972 | Anderson | 297/443 |
| 3,669,495 | 6/1972 | Von Rudgisch | 297/454 |
| 3,710,682 | 1/1973 | Hansen et al. | 244/122 R |
| 3,793,648 | 2/1974 | Dorve et al. | 2/2.5 |
| 3,801,416 | 4/1974 | Gulbierz | 89/36.01 |
| 4,601,516 | 7/1986 | Klein | 297/457 |
| 4,655,417 | 4/1987 | Herndon | 244/122 A |
| 4,824,624 | 4/1989 | Palicka et al. | 428/911 |

FOREIGN PATENT DOCUMENTS

| | | | |
|---|---|---|---|
| 0085601 | 8/1983 | European Pat. Off. | |
| 0293786 | 12/1988 | European Pat. Off. | |
| 2465186 | 3/1981 | France | 89/36.02 |
| 1151441 | 5/1969 | United Kingdom | 89/36.02 |

Primary Examiner—Stephen M. Johnson
Attorney, Agent, or Firm—Weingarten, Schurgin, Gagnebin & Hayes

[57] ABSTRACT

The seat comprises panels made of ceramic matrix composite and assembled to one another by shape and by adhesion, either by interposition of an adhesive or else by condensification using the ceramic matrix material. The invention is particularly suitable for armored seats for helicopters.

3 Claims, 1 Drawing Sheet

COMPOSITE ARMORED SEAT, AND METHOD OF MANUFACTURE

The present invention relates to an armored seat, and particularly, but not exclusively, an armored seat for a helicopter.

BACKGROUND OF THE INVENTION

It is well known to make armoring by means of sintered ceramic tiles exposed to impact from projectiles and fixed on a support layer, generally constituted by bonded-together laminations of fiber texture.

Document EP-A-0 293 786 proposes simplifying the structure and manufacture of a seat by replacing ceramic tiles with a limited number of monolithic ceramic pieces capable of having faces formed by a plurality of planes or by curved portions. The object of the present invention is likewise to provide a seat of simplified structure and manufacture, while nevertheless constituting highly effective protection.

SUMMARY OF THE INVENTION

According to the invention, this object is achieved by the seat comprising an assembly of ceramic-matrix composite panels assembled to one another by their shapes and by adhesion.

Ceramic-matrix composites (CMC) are constituted by a fiber reinforcing texture or "fiber preform" which is densified by a ceramic matrix. For example, the reinforcing texture may be constituted by layers of cloth made of refractory fibers such as carbon fibers or ceramic fibers. The ceramic matrix is infiltrated into the pores of the reinforcing texture. The matrix may be formed by chemical vapor infiltration or by liquid impregnation using a precursor for the ceramic of the matrix followed by treatment for transforming the precursor into a ceramic. Methods of manufacturing CMCs having a carbide matrix (e.g. silicon carbide) or an oxide matrix (e.g. alumina or zirconia) are described, in particular, in Documents FR-A-2 401 888 and EP-A-0 085 601.

With a residual porosity that is generally 10% to 15% by volume, CMCs have properties of hardness and of compression strength which enable them to shatter the core of a high velocity projectile, as do the sintered ceramics used in prior art armor. However, compared with such sintered ceramics, CMCs have several advantages.

Thus, CMCs combine a structural function with their protective function. They can be used to make parts of relatively large dimensions which are capable of withstanding several impacts without being totally destroyed. This makes it possible to limit the number of panels that need to be assembled together to constitute a seat, and to shape the panels to satisfy ergonomic requirements. It also makes it easy to shape panels so that they can be assembled by virtue of their shapes, for example by giving them mortise and tenon type shapes.

In addition, the kinetic energy of a projectile is absorbed within CMCs by their fibers becoming separated from the matrix, by their porosity collapsing, and by the fibers of the reinforcing texture bending in response to an impact. As a result, the kinetic energy of a projectile is absorbed with very little deformation of the opposite or "rear" face of the protective material, thereby avoiding secondary effects. This constitutes a significant advantage compared with conventional materials comprising laminations of cloth behind a "front" layer made up of sintered ceramic parts, since the impact of a projectile on the "front" of such prior art materials gives rise to relatively large deformation of the rear face and in some cases this can seriously reduce the protective effect.

Throughout this specification, the face of the protective material or "armor" that is intended to receive impacts is called the "front" face, even if it happens to face sideways or backwards in the finished seat. The opposite face of the material is called the "rear" face.

In addition, compared with sintered ceramics, CMCs can be used for structural purposes at temperatures greater than 400° C., and their density is lower (a relative density of about 2.5 for an SiC-SiC composite material compared with a relative density of about 3.6 for sintered alumina).

The panels constituting the structure of the seat may be caused to adhere together by interposing an adhesive while assembling together prefabricated CMC panels, or else after assembling together the fiber preforms of the panels by codensification of the assembled preforms with the ceramic matrix of the composite.

The structure constituted by the assembled CMC panels may be coated on the impact-receiving "front" face of the seat, by pieces that contribute to absorbing the kinetic energy of incident projectiles, which pieces may be made of sintered ceramic, for example, and are glued on the CMC structure. The assembly may be provided with a lining for providing protection against splinters, and also by seat padding.

BRIEF DESCRIPTION OF THE DRAWING

The sole FIGURE of the accompanying drawing shows one embodiment of a CMC armor seat structure of the invention.

DETAILED DESCRIPTION

Figure 1:
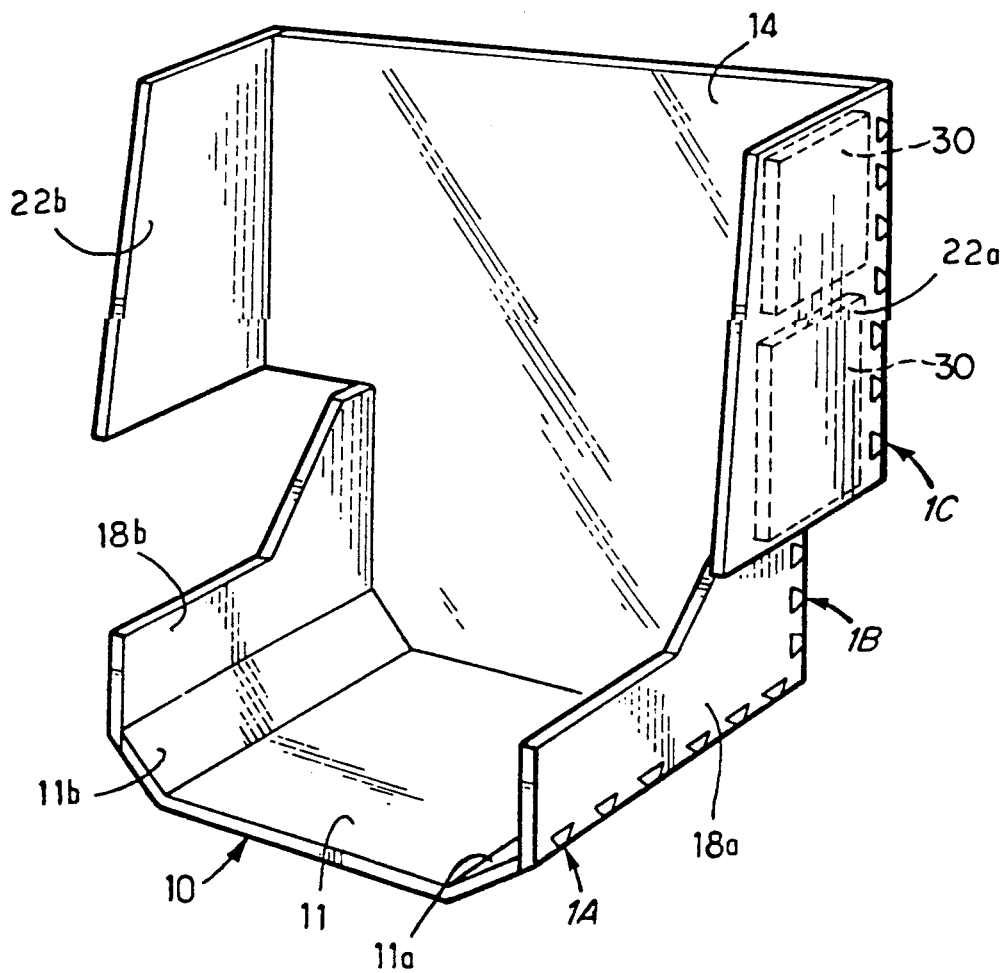
Figure 1A:
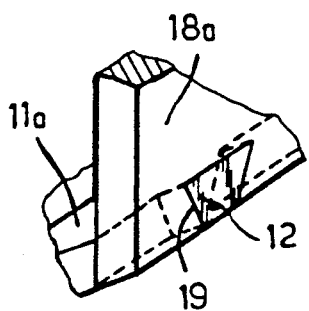
Figure 1B:
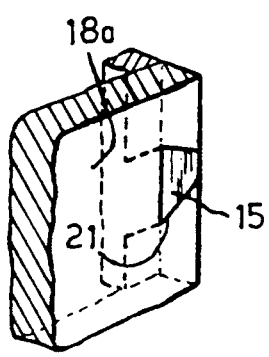
Figure 1C:
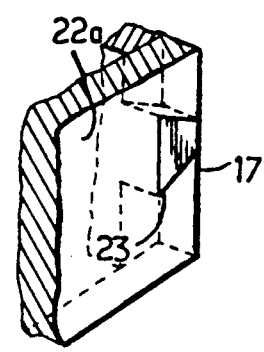

This structure is constituted by a plurality of assembled-together CMC panels, and comprises:

a panel 10 forming the bottom portion of the seat having a portion 11 constituting a horizontal slab extended on each side by respective upwardly sloping portions 11a and 11b;

a panel 14 constituting a back and which is wider at the top than at the bottom;

lower side panels 18a and 18b having respective rear portions that are raised relative to their front portions and which serve to provide side protection for the lower portion of the body, while the front portions thereof provide side protection to the thighs, with the transition between the front and rear portions being gradual; and upper side panels 22a and 22b providing side protection for the head, the neck, the chest, and the arms.

The panels are assembled together by interfitting shapes and by means of adhesive.

The interfitting shapes are in the form of mortise and tenon type joints, e.g. dovetail type joints. Thus, along the side edges of its portions 11a and 11b, the panel 10 has tenons 12 each integrally formed with the panel and projecting in the planes of the portions 11a and 11b to engage in corresponding mortises 19 formed along the bottom edges of the bottom side panels 18a and 18b. Similarly, the panel 14 has tenons 15 integrally formed therewith and projecting from the side edges of its bottom portion, these tenons being engaged in corresponding mortises 21 formed along the rear edges of the lower side panels 18a and 18b; and along the side edges of its upper portion, the panel 14 has tenons 17 integrally formed therewith and engaged in corresponding mortises 23 formed along the rear edges of the upper side panels 22a and 22b. The bottom of the panel 14 matches the rear profile constituted by the panel 10 and the side panels 18a and 18b. It is the side panels 18a and 18b that hold the seat and back panels 10 and 14 together. These two panels could also be assembled to each other by means of mortise and tenon type joints along their adjacent edges.

The panels constituting the structure of the seat are made of CMC.

In a first embodiment of the invention, these panels are individually prefabricated out of CMC and they are subsequently assembled together with an adhesive being interposed between them to fix them together permanently.

Each panel may be made, for example, of a carbon-ceramic type composite having a ceramic matrix containing a reinforcing texture made of carbon fibers. The carbon fiber texture may be constituted by a stack of cloth laminations (two dimensional laminations) running parallel to the large faces of the panel. Such a stack constitutes a preform. Alternatively, it could also be constituted by a three-dimensional fiber texture, e.g. made up of superposed two-dimensional laminations interconnected by needling or by implanting threads. The ceramic material of the matrix is infiltrated into the pores of the reinforcing texture by chemical vapor infiltration, with the cloth laminations being held by a jig. The ceramic material of the matrix may be silicon carbide, (SiC). A chemical vapour infiltration method using SiC is described in above-mentioned document FR-A-2 401 888. Infiltration is continued, preferably until the residual porosity is less than 15%.

In a variant, the panels may be made of a ceramic-ceramic type composite, e.g. of the SiC-SiC type. The reinforcing texture is made of laminations of SiC fiber cloth and it is densified by chemical vapor infiltration of SiC.

In other variants, ceramics other than SiC, e.g. alumina, zirconia, or boron carbide, may be used for forming the matrix of carbon-ceramic or ceramic-ceramic composite materials, or for forming the fibers of a reinforcing texture in a ceramic-ceramic composite material.

The mortises and tenons are advantageously formed in the panels while they are at the preform stage, i.e. in the reinforcing fiber texture. The required cut-outs may be made, for example, by means of laser or water-jet devices enabling accurate cutting to be performed. The cut-outs are formed in the dry fiber texture or in the texture after it has been impregnated or consolidated. Impregnation consists in bonding together the laminations of the texture by means of a resin, e.g. a temporary resin which is subsequently removed during the matrix infiltration stage. Consolidation consists in performing initial infiltration which is just sufficient for bonding together the laminations of the fiber texture.

When the CMC panels are manufactured separately, then they are assembled together with interposition of an adhesive such as a resin of the epoxy type including a ceramic powder filler.

In a second embodiment of the invention, the panel preforms are assembled together while they are in the dry texture state, or while they are merely impregnated, or while they are already consolidated; and after this assembly operation, the assembly is densified as a whole by chemical vapor infiltration of the matrix-constituting material. By virtue of its continuity across the interfaces between the panels, this material also serves to cause the panels to adhere together. Codensification of panel preforms by means of the ceramic matrix also ensures continuity in the ballistic protection.

As already mentioned, the CMC structure may be finished off on the front faces of the seat armor by sintered ceramic pieces 30 that may contribute to absorbing the kinetic energy of the projectiles (shown in phantom). These pieces are glued to the CMC structure by means of an epoxy type glue. The assembly may be provided with additional coatings, e.g. providing protection against splinters, and constituting padding for the seat.

In the example described above, the panels constituting the CMC structure have faces which are plane or which comprise a plurality of plane portions. Since CMCs are suitable for making shaped pieces of relatively large dimensions, these panels could naturally also have faces that are not plane, e.g. curved faces adapted to the geometry of the seat to be made. In addition, the number of panels used and the relative dispositions thereof may differ from those described by way of particular example.

We claim:

1. An armored seat comprising
   a structure constituted by a plurality of panels,
   wherein the panels have mutually interlocking elements and are made of a ceramic matrix composite,
   wherein said structure is held together by the interaction of the interlocking elements of said panels, and
   wherein each said panel has a front face provided with sintered ceramic pieces.

2. A seat according to claim 1, wherein the structure is further held together by the interaction of the interlocking elements of the panels with an adhesive being interposed therebetween.

3. An armored seat comprising
   a structure constituted by a plurality of panels,
   wherein the panels have mutually interlocking elements and are made of a ceramic matrix composite,
   wherein said structure is held together by the interaction of the interlocking elements of said panels, and
   wherein said plurality of panels is made up of panel preforms which are preassembled and held together to one another by the interaction of interlocking elements of the panel preforms and which are subsequently codensified by vapor infiltration with a material that is the same as the material which constitutes the ceramic matrix composite.

* * * * *

UNITED STATES PATENT AND TRADEMARK OFFICE
CERTIFICATE OF CORRECTION

PATENT NO. : 5,164,536
DATED : November 17, 1992
INVENTOR(S) : Francois R. Barbaza, et al.

It is certified that error appears in the above—identified patent and that said Letters Patent is hereby corrected as shown below:

On title page, item [75] "Pautillac;" should read
--Pauillac--; and "Vives, Eystines" should read
--Vivés, Eysines--.

Signed and Sealed this

Eighteenth Day of January, 1994

Attest:

BRUCE LEHMAN

Attesting Officer     Commissioner of Patents and Trademarks